US011831689B2

(12) United States Patent
Del Sordo et al.

(10) Patent No.: US 11,831,689 B2
(45) Date of Patent: Nov. 28, 2023

(54) PROVIDING TRANSFER AND CONFIGURATION OF WEB CONFERENCING BETWEEN CONSUMER DEVICES

(71) Applicant: ARRIS Enterprises LLC, Suwanee, GA (US)

(72) Inventors: Christopher S. Del Sordo, Souderton, PA (US); Albert F. Elcock, West Chester, PA (US); Richard Moore, Jr., Harleysville, PA (US); Marc E. Jasner, Horsham, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/335,115

(22) Filed: Jun. 1, 2021

(65) Prior Publication Data
US 2022/0070227 A1    Mar. 3, 2022

Related U.S. Application Data

(60) Provisional application No. 63/072,419, filed on Aug. 31, 2020.

(51) Int. Cl.
*H04L 65/1059* (2022.01)
*H04L 65/403* (2022.01)

(52) U.S. Cl.
CPC ........ *H04L 65/1059* (2013.01); *H04L 65/403* (2013.01)

(58) Field of Classification Search
CPC .......................... H04L 65/1059; H04L 65/403
(Continued)

(56) References Cited

U.S. PATENT DOCUMENTS

2005/0146598 A1    7/2005 AbiEzzi et al.
2007/0203980 A1    8/2007 Andersen
(Continued)

FOREIGN PATENT DOCUMENTS

KR    10-2008-0108425 A    12/2008
KR    10-2019-0025304 A    3/2019

OTHER PUBLICATIONS

Aakarsh, Join conference calls with Alexa, nowopen to all Alexa users!, Apr. 4, 2019,aws.amazon.com, https://aws.amazon.com/blogs/business-productivity/alexa-join-my-meeting-join-conference-calls-with-alexa-now-open-to-all-alexa-users/ (Year: 2019).*
(Continued)

*Primary Examiner* — Zi Ye
(74) *Attorney, Agent, or Firm* — Panitch Schwarze Belisario & Nadel LLC

(57) ABSTRACT

A method, system, and computer program product for providing transfer and configuration of web conferencing between consumer devices includes a processor to parse one or more electronic communications on one or more computing devices associated with a user to identify web conference data. The processor may extract the web conference data in the one or more electronic communications and transmit the web conference data and the user credential data to a media device. The media device may be a smart media device and/or a digital television. The process may further receive one or more web conference user preferences and/or user credential data and transmit the one or more web conference user preferences and/or the user credential data to the media device. The processor may display the web conference on the media device according to the one or more web conference user preferences.

19 Claims, 4 Drawing Sheets

(58) Field of Classification Search
USPC .......................................................... 709/204
See application file for complete search history.

(56) References Cited

U.S. PATENT DOCUMENTS

| | | | | |
|---|---|---|---|---|
| 2008/0159503 A1* | 7/2008 | Helbling | ............... | H04M 3/565 |
| | | | | 379/142.17 |
| 2009/0228808 A1 | 9/2009 | MacDonald et al. | | |
| 2010/0066805 A1* | 3/2010 | Tucker | ................... | H04N 7/148 |
| | | | | 348/E7.083 |
| 2011/0228922 A1* | 9/2011 | Dhara | ..................... | H04L 47/70 |
| | | | | 379/202.01 |
| 2012/0169830 A1* | 7/2012 | Manjrekar | ............... | H04N 7/15 |
| | | | | 348/E7.083 |
| 2013/0191891 A1 | 7/2013 | Adderly et al. | | |
| 2015/0373060 A1* | 12/2015 | Shmilov | ............... | H04L 65/605 |
| | | | | 370/329 |
| 2019/0075142 A1 | 3/2019 | Yoon et al. | | |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Sep. 9, 2021, by the International Application Division Korean Intellectual Property Office in corresponding International Application No. PCT/US2021/035088. (10 pages).

* cited by examiner

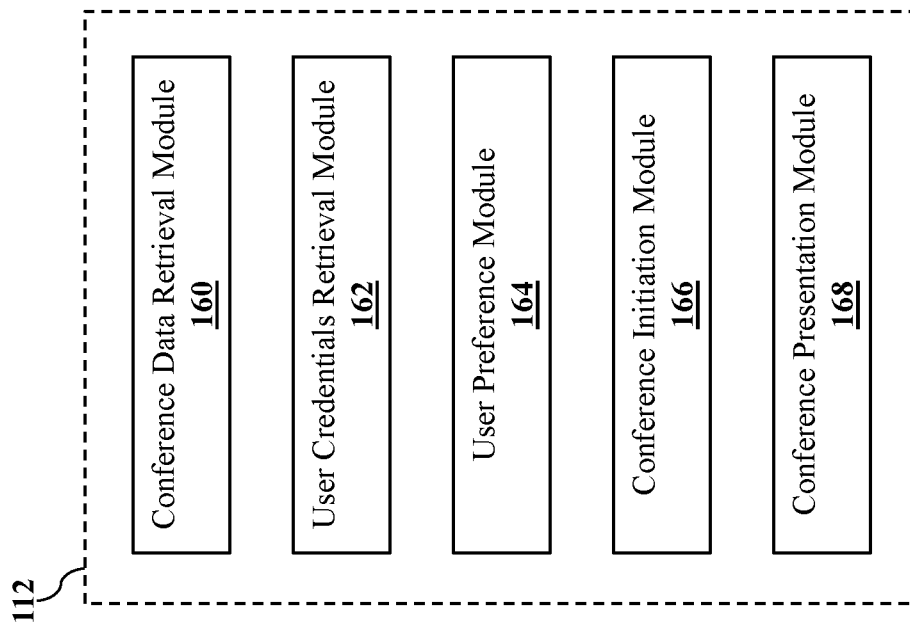

PROVIDING TRANSFER AND CONFIGURATION OF WEB CONFERENCING BETWEEN CONSUMER DEVICES

FIELD

The present disclosure relates generally to a method, system, and computer program product for providing transfer and configuration of web conferencing between consumer devices, and more particularly for enabling a user to transfer web conference data to a smart media device and initiate an associated web conference on the smart media device.

BACKGROUND

The streaming of media content to personal devices has become increasingly popular in recent years. In particular, consumers have been working from home at an increasing rate and relying more and more on web conferencing capabilities, e.g. video conferencing. However, current methods and systems of web conferencing are limited to desktop computers, laptops, and mobile devices as streaming media devices, such as set-top-boxes, have limited navigation capabilities and do not typically include email programs. Further, current methods and systems of web conferencing limit consumers to using a single computing device to participate in the web conference. Thus, there is a need for a technical solution that enables consumers to transfer and configure web conferencing between consumer computing devices including media devices.

SUMMARY

The present disclosure provides a description of exemplary methods, systems, and computer program products for providing transfer and configuration of web conferencing between consumer devices. The methods, systems, and computer program products for providing transfer and configuration of web conferencing between consumer devices may include a processor which can parse one or more electronic communications on one or more computing devices associated with a user to identify web conference data. The processor may extract the web conference data in the one or more electronic communications and transmit the web conference data and the user credential data to a media device. The media device may be a smart media device and/or a digital television. The process may further receive one or more web conference user preferences and/or user credential data and transmit the one or more web conference user preferences and/or the user credential data to the media device. The processor may display the web conference on the media device according to the one or more web conference user preferences.

BRIEF DESCRIPTION OF THE DRAWINGS

The scope of the present disclosure is best understood from the following detailed description of exemplary embodiments when read in conjunction with the accompanying drawings. Included in the drawings are the following figures:

FIG. 1b illustrates example operating modules of the web conference transfer program of FIG. 1a in accordance with exemplary embodiments;

DETAILED DESCRIPTION OF THE PREFERRED EMBODIMENTS AND METHODS

The present disclosure provides a novel solution for providing transfer and configuration of web conferencing between consumer devices. In current web conferencing technology, users are limited to use on desktop computers, laptops, and mobile devices. Further, current methods and systems of web conferencing limit a consumer to using a single computing device to participate in the web conference and they do not provide a means to transfer the web conference to another consumer device. The methods, systems, and computer program products herein provide a novel solution, not addressed by current technology, by enabling web conferencing users to take advantage of media device technology such as large screen sizes, multiple display technology such as picture-in-picture (PIP), high-definition displays, and integrated sound systems, etc. directly, rather than through screen sharing or as auxiliary monitors connected to a computer conducting the video conference. Further, exemplary embodiments of the methods, systems, and computer program products provided for herein enable users to set-up an automatic transfer of a web conference from a user computing device to a media device. Thus, the methods, systems, and computer program products provided for herein provide a novel way for transferring and configuring web conferencing between consumer computing devices including media devices.

Figure 1A:
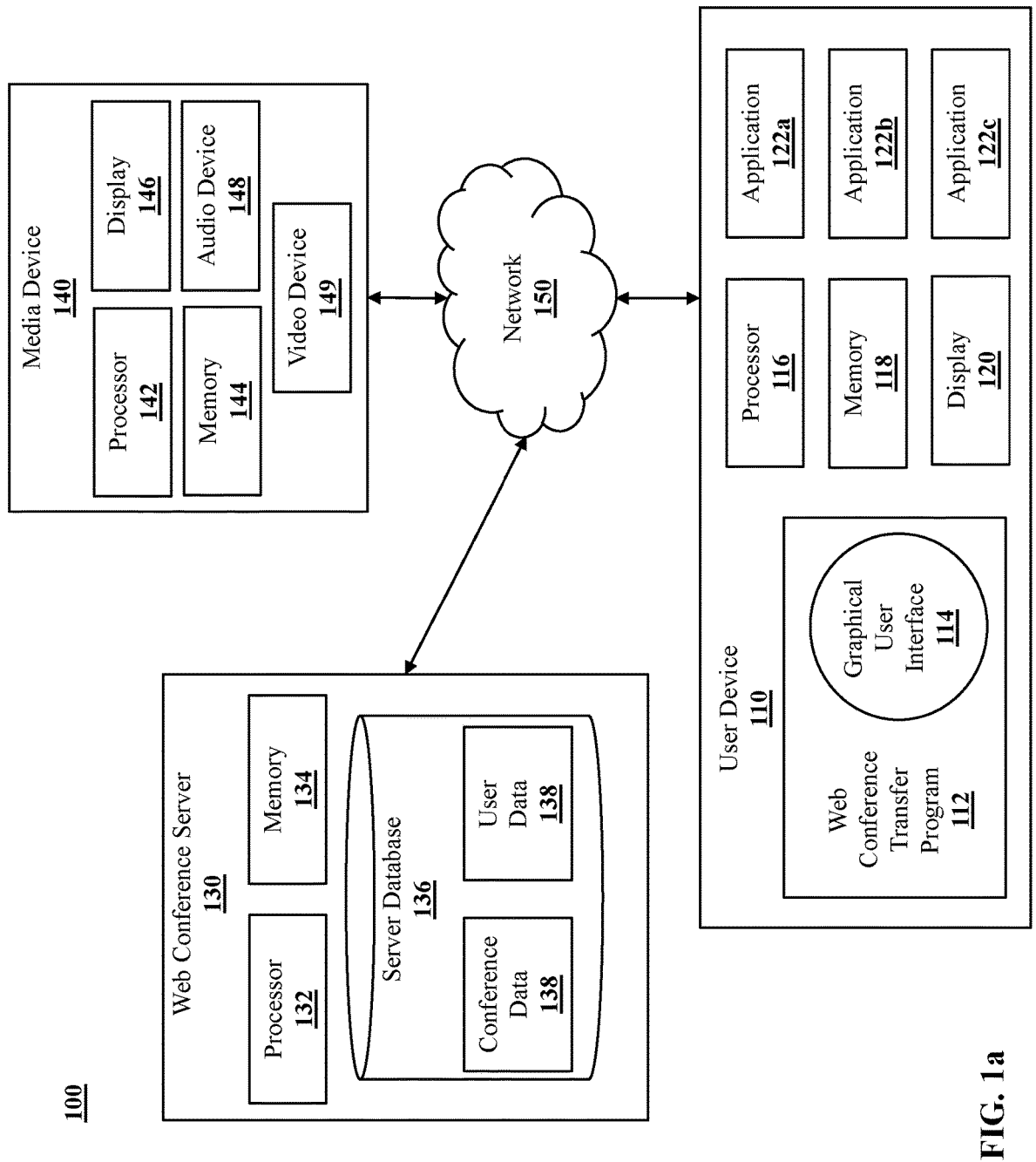
FIG. 1a is a block diagram that illustrating a high-level system architecture for providing transfer and configuration of web conferencing between consumer devices in accordance with exemplary embodiments.

System for Providing Transfer and Configuration of Web Conferencing Between Consumer Devices FIG. 1a illustrates an exemplary system 100 for providing transfer and configuration of web conferencing between consumer devices. The system 100 includes u user device 110, a web conference server 130, and a Media Device 140 connected via a network 150.

The user device 110 includes a web conference transfer program 112, a processor 116, a memory 118, a display 120, and applications 122a-c. The user device 110 may be a desktop computer, a notebook, a laptop computer, a tablet computer, a handheld device, a smart-phone, a thin client, or any other electronic device or computing system capable of storing, compiling, and organizing audio, visual, or textual data and receiving and sending that data to and from other computing devices, such as the web conference server 130 and the media device 140. In an exemplary embodiments, the user device 110 receives the web conference data 138 from the web conference server 130 via the applications 122a-c. For example, the applications 122a-c may be, but are not limited to, web conferencing applications, e-mail applications, or any other application capable of receiving, transmitting, storing, compiling, and/or organizing the web conference data 138. While three applications 122a-c are illustrated, it can be appreciated that the user device 110 may contain less than or more than three applications 122. In some embodiments, the user device 110 may include one or more computing devices. Further, while a single user device 110 is illustrated as part of the system 100, it can be appreciated that any number of user devices 110 may be a part of the system 100. For example, a user may have multiple user devices 110 such as, but not limited to, a desktop computer, a laptop, and a mobile phone. In the context of a video conference, there would be at least two user devices 110.

The web conference transfer program 112 includes a graphical user interface 114. The web conference transfer program 112 can include the conference data retrieval module 160, the user credentials retrieval module 162, the user preference module 164, the conference initiation module 166, and the conference presentation module 168 as illustrated in FIG. 1b. The web conference transfer program 112 is a computer program specifically programmed to implement the methods and functions disclosed herein for providing transfer and configuration of web conferencing between consumer devices. The web conference transfer program 112 and the modules 160-168 are discussed in more detail below with reference to FIGS. 1b and 2. In exemplary embodiments, the web conference transfer program 112 may parse and extract web conference data 138 received by the applications 122a-c for transferring and initiating a web conference to the media device 140.

The graphical user interface 114 can include components used to receive input from the user device 110 and transmit the input to the web conference transfer program 112, or conversely to receive information from the web conference transfer program 112 and display the information on the user device 110 and/or the media device 140. In an exemplary embodiment, the graphical user interfaces 114 uses a combination of technologies and devices, such as device drivers, to provide a platform to enable users of user device 110 to interact with the web conference transfer program 112. In the exemplary embodiment, the graphical user interface 114 receives input from a physical input device, such as a keyboard, mouse, touchpad, touchscreen, camera, microphone, etc.

The processor 116 may be a special purpose or a general purpose processor device specifically configured to perform the functions discussed herein. The processor 116 unit or device as discussed herein may be a single processor, a plurality of processors, or combinations thereof. Processor devices may have one or more processor cores. In an exemplary embodiment, the processor 116 is configured to perform the functions associated with the modules of the web conference transfer program 112 as discussed below with reference to FIGS. 1b and 2.

The memory 118 can be a random access memory, read-only memory, or any other known memory configurations. Further, the memory 118 can include one or more additional memories in some embodiments. The memory and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the user device 110. Computer programs, e.g., computer control logic, can be stored in the memory 118.

The display 120 can be any display capable of receiving display signals from another computing device, such as the web conference server 130, the media device 140, and/or the user devices 110, and outputting those display signals to a display unit such as, but not limited to, a LCD screen, plasma screen, LED screen, DLP screen, CRT screen, etc. While the display 120 is illustrated a part of the user device 110, it can be appreciated that the display 120 may be a separate display device.

The web conference server 130 includes a processor 132, a memory 134, and a server database 136. The web conference server 130 may be any type of electronic device or computing system specially configured to perform the functions discussed herein, such as the computing system 300 illustrated in FIG. 3. Further, it can be appreciated that the web conference server 130 may include one or more computing devices. In an exemplary embodiment of the system 100, the web conference server 130 is a server associated with any web conferencing service provider.

The processor 132 may be a special purpose or a general purpose processor device specifically configured to perform the functions discussed herein. The processor 132 unit or device as discussed herein may be a single processor, a plurality of processors, or combinations thereof. Processor devices may have one or more processor cores. In an exemplary embodiment, the processor 132 may be configured to perform the functions associated with a web conferencing program such as, but not limited to, Skype®, Zoom®, Webex®, Microsoft Teams®, etc., or any other suitable conferencing program.

The memory 134 can be a random access memory, read-only memory, or any other known memory configurations. Further, the memory 134 can include one or more additional memories in some embodiments such as the server database 136. The memory and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the user web conference server device 130. Computer programs, e.g., computer control logic, can be stored in the memory 134.

The server database 136 can include conference data 138 and user data 139. The server database 136 can be any suitable database configuration, such as a relational database, a structured query language (SQL) database, a distributed database, or an object database, etc. Suitable configurations and storage types will be apparent to persons having skill in the relevant. In an exemplary embodiment of the system 100, the server database 136 stores the conference data 138 and the user data 139. The conference data 138 can include data such as, but not limited to, web conferencing program data, user account data, web conference login data, web conference hosting data, a meeting identification, a meeting host, one or more meeting participants, a meeting password, a meeting uniform resource locator (URL), and a meeting duration, etc. In an exemplary embodiment, the conference data 138 may include web conference data for a web conference to be hosted by or attended by a user of the user device 110. The web conference data 138 may also include web conference alert data such as, but not limited to, an audible start time alert, a visible start time alert, web conference reminder data, etc. The user data 139 can include user credential data and/or web conference user preferences. The user credential data may include, for example, but is not limited to, user account username and a user account password, etc. The web conference user preferences may include, for example, but is not limited to, audio preferences, alert preferences, and media device preferences web conference user preferences, etc.

The media device 140 can include a processor 142, a memory 144, a display 146, an audio device 148, and a video device 149. While the media device 140 and the user device 110 are illustrated as separate devices, it can be appreciated that the media device 140 and the user device 110 can be the same device. The media device 140 may be any type of electronic device or computing system capable of receiving and decoding the conference data 138 from the user device 110 and/or the web conference server 130. In exemplary embodiments, the media device 140 may be a smart media device (SMD) such as, but not limited to, a Smart Media Streamer device, a set-top box (STB), a smart television, an Apple TV® device, an Amazon Fire® TV device, and a Roku TV device, etc., or any other suitable media device capable of carrying out the functions described herein. In other embodiments for example, the media device 140 may be any digital television.

The processor 142 may be a special purpose or a general purpose processor device specifically configured to perform the functions discussed herein. The processor 142 unit or device as discussed herein may be a single processor, a plurality of processors, or combinations thereof. Processor devices may have one or more processor cores. In an exemplary embodiment, the processor 142 may be configured to perform the functions associated with the modules of the web conference transfer program 112 as discussed below with reference to FIGS. 1b and 2.

The memory 144 can be a random access memory, read-only memory, or any other known memory configurations. Further, the memory 134 can include one or more additional memories in some embodiments. The memory and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the media device 140. Computer programs, e.g., computer control logic, can be stored in the memory 144.

The display 146 can be any display capable of receiving display signals from another computing device, such as user device 110, and/or the web conference server 130 and outputting those display signals to a display unit such as, but not limited to, a LCD screen, plasma screen, LED screen, DLP screen, CRT screen, etc. While the display 146 is illustrated a part of the media device 140, it can be appreciated that the display 146 may be a separate display device.

The audio device 148 can be any audio device capable of receiving audio data and transmitting that audio data to and from a user of the media device 140. For example, the audio device 148 may be, but not limited to, a microphone (e.g. an onboard far field microphone), far field speakers, wired headphones, wireless headphones, hearing aids, wired speaker, wireless speakers, or any other suitable audio device, etc. In exemplary embodiments, the audio device 148 may receive voice commands from a user of the media device 140. For example, but not limited to, a user of the media device 140 may speak voice commands to initiate a web conference, control the settings (e.g. audio settings or video settings, etc.) of a web conference, or terminate a web conference, etc. While the user audio device 148 is illustrated as part of the media device 140, it can be appreciated that the audio device 148 may be connected to the media device 140 by any suitable wired or wireless means. In exemplary embodiments, the audio device 148 is any audio device that enables a user to audibly interact with a web conference.

The video device 149 can be any video device capable of receiving video data and transmitting that video data to and from the media device 140 to one or more other computing devices such as, but not limited to, the user device 110, the web conference server 130, or any other computing device capable of receiving the video data, etc. While the video device 149 is illustrated as part of the media device 140, it can be appreciated that the video device 149 may be connected to the media device 140 by any suitable wired or wireless means. In exemplary embodiments, the video device 149 is any video device that enables a user to visibly interact with a web conference. For example, the video device 149 may be, but is not limited to, a camera, or a webcam, etc.

In exemplary embodiments, the components of the system 100, e.g. the user device 110, the web conference server 130, and the media device 140, can communicate via the network 150. The network 150 may be any suitable wired or wireless communications network for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art.

Figure 2:
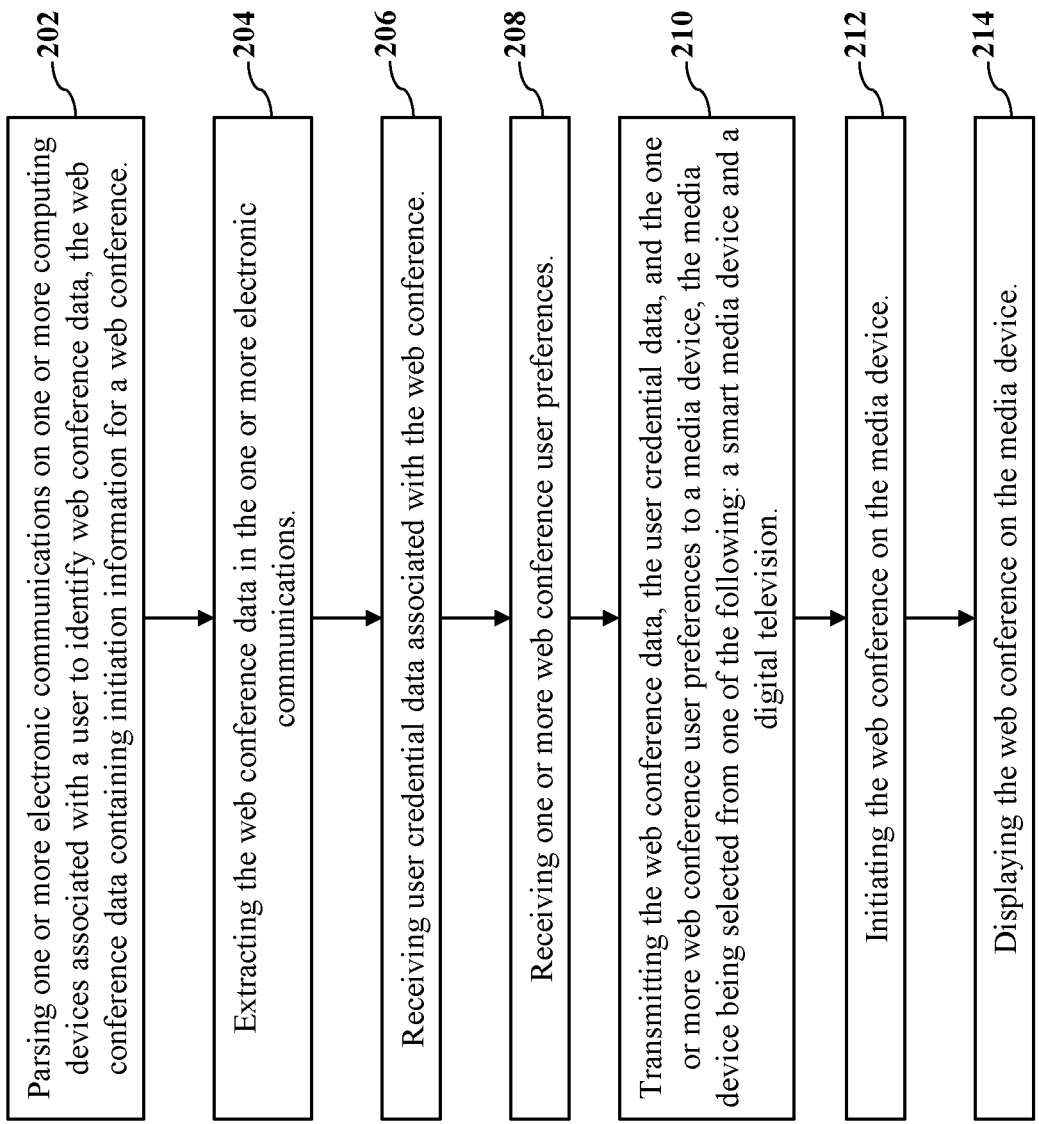
FIG. 2 is a flow chart illustrating an exemplary method for providing transfer and configuration of web conferencing between consumer devices in accordance with exemplary embodiments.

Exemplary Method for Providing Transfer and Configuration of Web Conferencing Between Consumer Devices FIG. 2 illustrates a flow chart of an exemplary method 200 for providing transfer and configuration of web conferencing between consumer devices in accordance with exemplary embodiments.

In an exemplary embodiment, the method 200 can include block 202 for parsing one or more electronic communications on one or more computing devices, e.g., the user device 110, associated with a user to identify web conference data, e.g., the conference data 138, the web conference data containing initiation information for a web conference. For example, the web conference transfer program 112 may parse the applications 122a-c for the web conference data 138. The web conference transfer program 112 may parse the text of the applications 122a-c and/or the web conference transfer program 112 may use an application plugin to parse the text of the applications 122a-c. In an exemplary embodiment of the system 100, the conference data retrieval module 160 can be configured to execute the method of block 202.

In an exemplary embodiment, the method 200 can include block 204 for extracting the web conference data 138 in the one or more electronic communications. For example, the web conference transfer program 112 may extract the web conference data 138 from the user device 110. The web conference data 138 may be extracted using, for example, but not limited to, a plugin running on one or more of the applications 122a-c. In an exemplary embodiment of the system 100, the conference data retrieval module 160 can be configured to execute the method of block 204.

In an exemplary embodiment, the method 200 can include block 206 for receiving user credential data associated with the web conference. The web conference transfer program 112 may receive the user credential data from the user data 139 on the web conference server 130 and/or from the user device 110. For example, the web conference transfer program 112 may receive the user credential data from the user device 110 via the graphical user interface 114 and/or during the parsing of the applications 122a-c. In an exemplary embodiment of the system 100, the user credentials retrieval module 162 can be configured to execute the method of block 206.

In an exemplary embodiment, the method 200 can include block 208 for receiving one or more web conference user preferences. The web conference transfer program 112 may receive the one or more web conference user preferences from the user data 139 on the web conference server 130 and/or from the user device 110. For example, the web conference transfer program 112 may receive the one or more web conference user preferences from the user device 110 via the graphical user interface 114 and/or during the parsing of the applications 122a-c. In an exemplary embodiment of the system 100, the user preference module 164 can be configured to execute the method of block 208.

In an exemplary embodiment, the method 200 can include block 210 for transmitting the web conference data 138, the user credential data, and the one or more web conference user preferences to the media device 130. For example, the web conference transfer program 112 may transmit the web conference data 138, the user credential data, and/or the one or more web conference user preferences to the media device 130 for initiation of a web conference. The web conference transfer program 112 may transmit the web conference data 138, the user credential data, and the one or more web conference user preferences to the media device 130 in response to user input via the graphical user interface 114. For example, a user on the user device 110 may initiate a web conference on the user device 110 and then transfer the web conference to the media device 140 via the graphical user interface 114. In other embodiments, the web conference transfer program 112 may transmit the web conference data 138, the user credential data, and the one or more web conference user preferences to the media device 130 in response to one or more of the web conference user preferences and/or the web conference data 138 parsed from the applications 122a-c. For example, the web conference data 138 may include an option for a user to designate a device to initiate a web conference or the user may set a user device preference. In an exemplary embodiment of the system 100, the conference initiation module 166 can be configured to execute the method of block 210.

In an exemplary embodiment, the method 200 can include block 212 for initiating the web conference on the media device 140. The media device 140 may initiate the web conference in accordance with the web conference data 138, the user credential data, and/or the one or more web conference user preferences. For example, the media device 140 may initiate the web conference by activating the media device 140. In an exemplary embodiment, the media device 140 may initiate the web conference in response to a receiving a voice command, e.g. via the audio device 148, from a user of the media device 140. Initiating the web conference can also include sending an alert to the user via the media device 140 and/or the user device 110, such as, but not limited to, an audio alert or text alert, etc. The alert may be, but is not limited to, a web conference start time alert, a web conference reminder alert, a web conference schedule alert, etc. In an embodiment, the alert may be sent via an on-board voice service of the media device 140. In an exemplary embodiment of the system 100, the conference initiation module 166 can be configured to execute the method of block 212.

In an exemplary embodiment, the method 200 can include block 214 for displaying the web conference on the media device. The media device 140 may display the web conference in accordance with the web conference data 138, the user credential data, and/or the one or more web conference user preferences. For example, the media device 140 may display the web conference in accordance with user display and/or audio preferences, such as, but not limited, as a picture-in-picture (PIP) display with another media stream, a full-screen display, a wireless audio stream, a wired audio stream, etc. In an exemplary embodiment of the system 100, the conference presentation module 168 can be configured to execute the method of block 214.

Computer System Architecture

Figure 3:
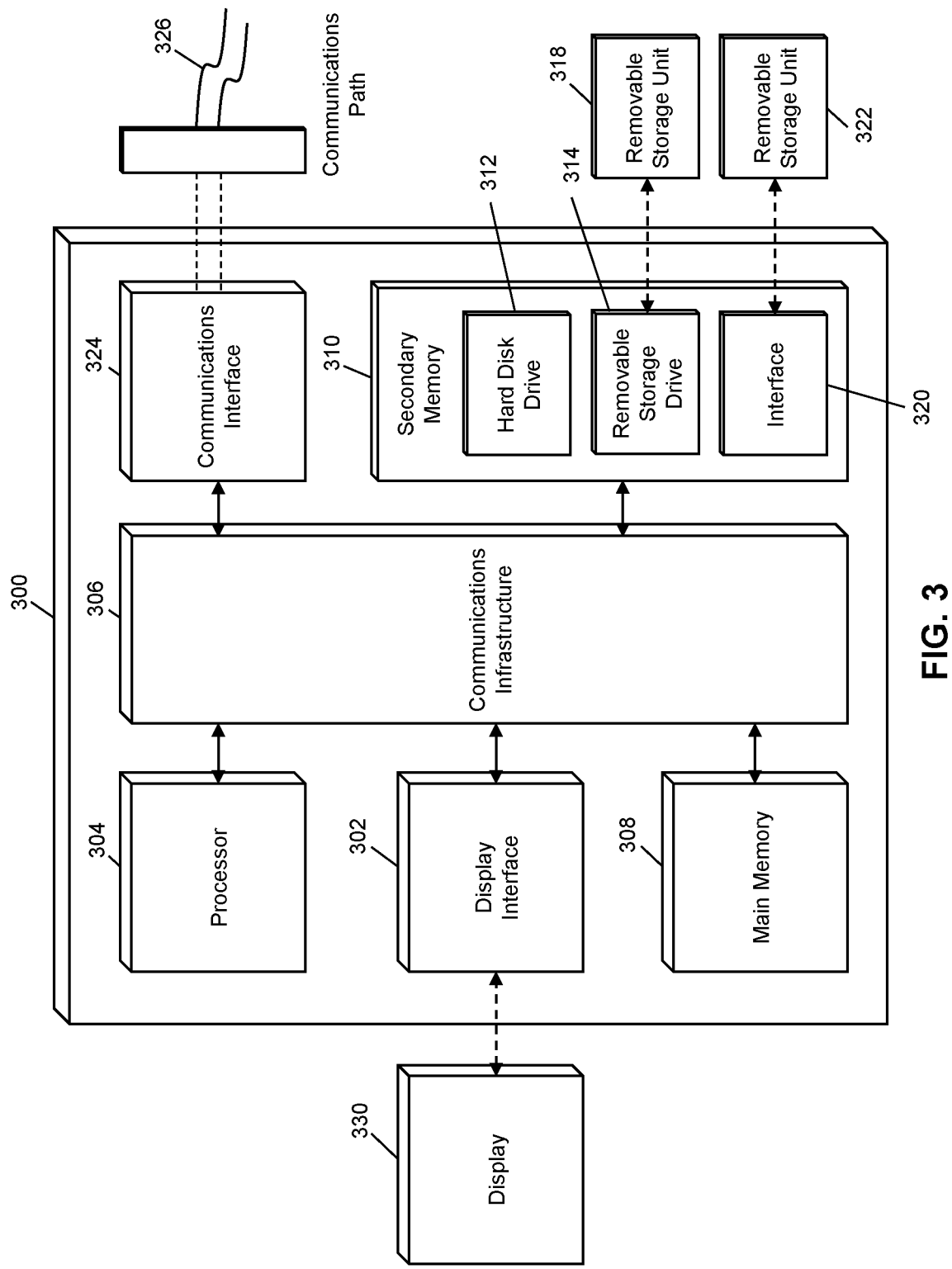
FIG. 3 is a block diagram illustrating a computer system architecture in accordance with exemplary embodiments Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure

FIG. 3 illustrates a computer system 300 in which embodiments of the present disclosure, or portions thereof, may be implemented as computer-readable code. For example, the user device 110, and the web conference server 130 of FIG. 1a may be implemented in the computer system 300 using hardware, software executed on hardware, firmware, non-transitory computer readable media having instructions stored thereon, or a combination thereof and may be implemented in one or more computer systems or other processing systems. Hardware, software, or any combination thereof may embody modules, such as the modules 160-168 of FIG. 1b, and components used to implement the methods of FIG. 2.

If programmable logic is used, such logic may execute on a commercially available processing platform configured by executable software code to become a specific purpose computer, or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor cores. The terms "computer program medium," "non-transitory computer readable medium," and "computer usable medium" as discussed herein are used to generally refer to tangible media such as a removable storage unit 318, a removable storage unit 322, and a hard disk installed in hard disk drive 312, or other suitable device capable of carrying out the functions described herein.

Various embodiments of the present disclosure are described in terms of this example computer system 300. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The processor device 304 may be a special purpose or a general purpose processor device specifically configured to perform the functions discussed herein. The processor device 304 may be connected to a communications infrastructure 306, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 300 may also include a main memory 308 (e.g., random access memory, read-only memory, etc.), and may also include a secondary memory 310. The secondary memory 310 may include the hard disk drive 312 and a removable storage drive 314, such as a floppy disk drive, a magnetic tape drive, an optical disk drive, a flash memory, etc.

The removable storage drive 314 may read from and/or write to the removable storage unit 318 in a well-known manner. The removable storage unit 318 may include a removable storage media that may be read by and written to by the removable storage drive 314. For example, if the removable storage drive 314 is a floppy disk drive or universal serial bus port, the removable storage unit 318 may be a floppy disk or portable flash drive, respectively.

In some embodiments, the secondary memory 310 may include alternative means for allowing computer programs or other instructions to be loaded into the computer system 300, for example, the removable storage unit 322 and an interface 320. Examples of such means may include a program cartridge and cartridge interface (e.g., as found in video game systems), a removable memory chip (e.g., EEPROM, PROM, etc.) and associated socket, and other removable storage units 322 and interfaces 320 as will be apparent to persons having skill in the relevant art.

Data stored in the computer system 300 (e.g., in the main memory 308 and/or the secondary memory 310) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 300 may also include a communications interface 324. The communications interface 324 may be configured to allow software and data to be transferred between the computer system 300 and external devices. Exemplary communications interfaces 324 may include a modem, a network interface (e.g., an Ethernet card), a communications port, a PCMCIA slot and card, etc. Software and data transferred via the communications interface 324 may be in the form of signals, which may be electronic, electromagnetic, optical, or other signals as will be apparent to persons having skill in the relevant art. The signals may travel via a communications path 326, which may be configured to carry the signals and may be implemented using wire, cable, fiber optics, a phone line, a cellular phone link, a radio frequency link, etc.

The computer system 300 may further include a display interface 302. The display interface 302 may be configured to allow data to be transferred between the computer system 300 and external display 330. Exemplary display interfaces 302 may include high-definition multimedia interface (HDMI), digital visual interface (DVI), video graphics array (VGA), etc. The display 330 may be any suitable type of display for displaying data transmitted via the display interface 302 of the computer system 300, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 308 and secondary memory 310, which may be memory semiconductors (e.g., DRAMs, etc.). These computer program products may be means for providing software to the computer system 300. Computer programs (e.g., computer control logic) may be stored in the main memory 308 and/or the secondary memory 310. Computer programs may also be received via the communications interface 324. Such computer programs, when executed, may enable computer system 300 to implement the present methods as discussed herein. In particular, the computer programs, when executed, may enable processor device 304 to implement the methods illustrated by FIGS. 2a-2b, as discussed herein. Accordingly, such computer programs may represent controllers of the computer system 300. Where the present disclosure is implemented using software, the software may be stored in a computer program product and loaded into the computer system 300 using the removable storage drive 314, interface 320, and hard disk drive 312, or communications interface 324.

The processor device 304 may comprise one or more modules or engines, such as the modules 140-148, configured to perform the functions of the computer system 300. Each of the modules or engines may be implemented using hardware and, in some instances, may also utilize software, such as corresponding to program code and/or programs stored in the main memory 308 or secondary memory 310. In such instances, program code may be compiled by the processor device 304 (e.g., by a compiling module or engine) prior to execution by the hardware of the computer system 300. For example, the program code may be source code written in a programming language that is translated into a lower level language, such as assembly language or machine code, for execution by the processor device 304 and/or any additional hardware components of the computer system 300. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 300 to perform the functions disclosed herein. It will be apparent to persons having skill in the relevant art that such processes result in the computer system 300 being a specially configured computer system 300 uniquely programmed to perform the functions discussed above.

While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope

What is claimed is:

1. A method for providing transfer and configuration of web conferencing between consumer devices, the method comprising:

parsing, by a computing device, one or more electronic communications received via one or more applications associated with a user present on the computing device and/or present on one or more secondary computing devices to identify web conference data, the web conference data including web conference initiation data, wherein the web conference initiation data includes a user designated media device for initiating the web conference, the media device being selected from one of the following: a smart media device and a digital television;

extracting, by the computing device, the web conference data in the one or more electronic communications;

receiving, by the computing device, user credential data associated with the web conference, the user credential data includes a user account username and a user account password; and transmitting, by the computing device, the web conference data and the user credential data to the user designated media device.

2. A method according to claim 1, comprising:
transmitting, by the computing device, a notification indicating the web conference start time via the media device, the notification being an audio and/or text alert.

3. A method according to claim 1, comprising:
receiving, by the computing device, one or more web conference user preferences, the user preferences including one or more of the group consisting of: video preferences, audio preferences, alert preferences, and media device preferences; and transmitting, by the computing device, the one or more web conference user preferences to the media device.

4. A method as in claim 3, comprising:
initiating, by the media device, the web conference, the web conference being initiated according to the one or more web conference user preferences.

5. A method as in claim 4, wherein initiating the web conference comprises:
receiving, by the media device, an audio command from the user via an audio device associated with media device; and displaying, by the media device, the web conference on the media device.

6. The method of claim 5, wherein the displaying web conference on the media device includes:
displaying, by the computing device, the web conference as a picture-in-picture (PIP) display with another media stream.

7. A method as in claim 1, wherein the web conference data is parsed from the text of the one or more applications associated with the user on the computing device and/or the one or more secondary computing devices.

8. A method as in claim 1, wherein the web conference data is parsed from the one or more applications on the computing device and/or the one or more secondary computing devices using an application plugin.

9. A method as in claim 1, wherein the web conference data includes one or more of the group consisting of: a meeting identification, a meeting host, one or more meeting participants, a meeting password, a meeting uniform resource locator (URL), a meeting duration, and web conference alert data.

10. A system for providing transfer and configuration of web conferencing between consumer devices, the system comprising:

a media device; and
a computing device, the computing device configured to:
parse one or more electronic communications received via one or more applications associated with a user present on the computing device and/or on one or more secondary computing devices to identify web conference data, the web conference data including web conference initiation data, wherein the web conference initiation data includes a user designated media device for initiating the web conference, the media device being selected from one of the following: a smart media device and a digital television;

extract the web conference data in the one or more electronic communications;

receive user credential data associated with the web conference, the user credential data includes a user account username and a user account password; and transmit the web conference data and the user credential data to the user designated media device.

11. A system according to claim 10, the computing device configured to:
transmit a notification indicating the web conference start time via the media device, the notification being an audio and/or text alert.

12. A system according to claim 10, the computing device configured to:
receive one or more web conference user preferences, the user preferences including one or more of the group consisting of: video preferences, audio preferences, alert preferences, and media device preferences; and transmit the one or more web conference user preferences to the media device.

13. A system as in claim 12, the media device configured to:
instructions to initiate the web conference on the media device, the web conference being initiated according to the one or more web conference user preferences.

14. A system as in claim 13, wherein initiating the web conference includes the media device configured to:
receive an audio command from the user via an audio device associated with media device; and display the web conference on the media device.

15. A system as in claim 10, wherein the web conference data is parsed from the text of the one or more applications on the computing device and/or the one or more secondary computing devices.

16. A system as in claim 10, wherein the web conference data is parsed from the one or more applications on the computing device and/or the one or more secondary computing devices using an application plugin.

17. A system as in claim 10, wherein the web conference data includes one or more of the group consisting of: a meeting identification, a meeting host, one or more meeting participants, a meeting password, a meeting uniform resource locator (URL), a meeting duration, and web conference alert data.

18. A non-transitory computer program product for inter providing transfer and configuration of web conferencing between consumer devices, the computer program product comprising:
a computer-readable storage medium having program instructions embodied therewith, the program instructions executable by a computer to cause the computer to perform a method, comprising:

parsing one or more electronic communications received via one or more applications associated with a user present on the computing device and/or present on one or more computing devices to identify web conference data, the web conference data including web conference initiation data, wherein the web conference initiation data includes a user designated media device for initiating the web conference, the media device being selected from one of the following: a smart media device and a digital television;

extracting the web conference data in the one or more electronic communications;

receiving user credential data associated with the web conference, the user credential data includes a user account username and a user account password; and transmitting the web conference data and the user credential data to the user designated media device.

19. A non-transitory computer program product according to claim 18, comprising:

receiving one or more web conference user preferences, the user preferences including one or more of the group consisting of: video preferences, audio preferences, alert preferences, and media device preferences; and transmitting the one or more web conference user preferences to the media device; and initiating the web conference on the media device, the web conference being initiated according to the one or more web conference user preferences.

* * * * *